BEST AVAILABLE COPY
BEST AVAILABLE COPY
H. C. BULL.
APPARATUS FOR CLEANING PRIVIES.
No. 6,962. Reissued Feb. 29, 1876.
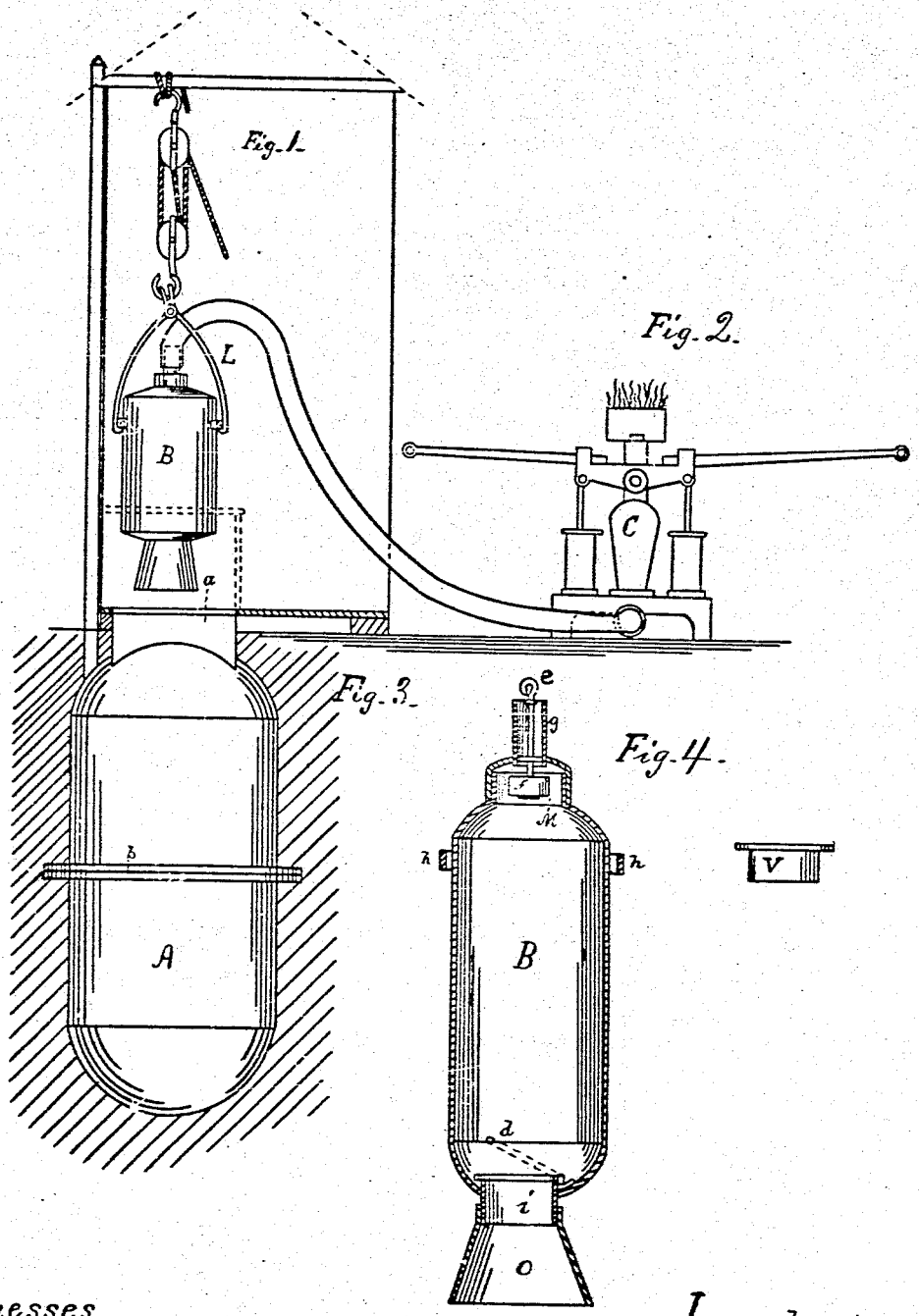
Witnesses.
Philip F. Larner
A. B. Cauldwell
Inventor.
Henry C. Bull
By Mm. C. Wood
Attorney

UNITED STATES PATENT OFFICE.

HENRY C. BULL, OF BROOKLYN, NEW YORK, ASSIGNOR, BY MESNE ASSIGNMENTS, TO LEWIS R. KEIZER.

IMPROVEMENT IN APPARATUS FOR CLEANING PRIVIES.

Specification forming part of Letters Patent No. 115,565, dated June 6, 1871; reissue No. 6,962, dated February 29, 1876; application filed January 11, 1876.

*To all whom it may concern:*

Be it known that I, HENRY C. BULL, formerly of the city of New Orleans, in the State of Louisiana, now of Brooklyn, in the State of New York, have invented certain Improvements in Apparatus for Cleaning Privies; and I do hereby declare that the following specification, taken in connection with the drawings furnished and forming a part of the same, is a true, clear, and complete description thereof.

Prior to my said improvement the contents of privy-vaults and other similar receptacles, generally known as "night-soil," have been transferred to transit-tanks by means of dippers and buckets, or by means of one of three general modes of operation, involving the use of mechanical contrivances. One of these methods involved the use of an endless chain with buckets attached thereto, operated by means of a rag-wheel and crank, whereby the offensive matters were raised from the vault within a close-walled portable structure, and emptied from the bucket into a tubular chute, at the discharge end of which the transit-tank was located. Communicating with the tubular chute a deodorizer was arranged, for disinfecting the offensive gases evolved during the operation.

Another method, known as the pumping and forcing system, involves the employment of a forcing-engine, a transit-tank, and a deodorizer, whereby the contents of the vault are drawn by suction to the pump, and forced therefrom into the transit-tank, from which the offensive gases are conducted to a deodorizer.

Another method involves the employment of apparatus operating under what is known as the "vacuum system," and it is to this system that my improvements relate.

So far as my knowledge extends, apparatus operating under the forcing and vacuum systems has heretofore embodied in all cases large transit-tanks, which were mounted upon wheels, and this necessarily involves the use of a considerable length either of suction-hose alone, or, in addition thereto, of conducting-hose, because in practice the heavy tanks and their carriages can seldom be located closely adjacent to the vault to be emptied, as it is well known that such vaults in cities are generally hedged in by walls of buildings and by fences, leaving but little space around the vault for working operations; and although the mechanical apparatus before referred to, consisting of the chain and buckets, was arranged to deliver the offensive matter into small casks, it was rendered practically worthless for inoffensively operating in close quarters by reason of the bulk of the apparatus, and the portable air-tight inclosing structure within which it was necessarily mounted and operated. By reason of my invention I am enabled under any and all circumstances to transfer the contents of privy-vaults to transit-tanks, regardless of limited space, because the several parts of my apparatus are readily adjustable and locatable in relation with each other and to the vault to be emptied; and any vault having a passage-way leading to it capable of receiving a barrel can be readily emptied of its contents with my improved apparatus without offense, even though it be necessary to carry the entire apparatus and the matter to be removed through a dwelling-house.

It is well known that the power of atmospheric pressure cannot be relied upon for lifting fluid matters lying below a certain depth, and that friction of the matter within the suction-pipe lessens this capacity more or less; also, that the more solid matters the fluid contains the greater the friction. For these reasons the vacuum system, as heretofore practiced, could seldom be relied upon for emptying a vault-well deeper than about fifteen or twenty feet. In some cities vault-wells have a depth of about forty feet, and one object of my invention is to empty, by the vacuum system, vaults so deep that they could not be emptied by that system as heretofore practiced.

It is well known, too, that heavy transit-tanks on wheels, when filled, must be conveyed to a convenient place for discharge: if to the country by the road, much time is consumed; if to a dock, it is discharged in mass to the hold of a barge. In neither case can this valnable fertilizer be distributed conveniently in lots to suit to small farmers and gardeners on rail and regular water routes.

One object of my invention is to enable the offensive matter to be made an article of trade and susceptible of being conveyed, in lots of any desired quantity, by traveled routes and by the usual means of public conveyance, without creating offense.

My invention consists, mainly, in a sink-cleaning apparatus, consisting of an air-pump, a deodorizer, and suitable tubular connections, in combination with an independent or movable receiving cask, having an induction passage or opening, and also an air-passage for connecting with the air-pump, and provided with stench and water tight covers for both passages, whereby the movable cask may be located in any desired position with relation to the vault, and the air-pump and the deodorizer properly located with reference to the vault and cask, and also whereby the cask, when filled, may be trundled on its bilge or end, after the usual manner of handling casks or barrels.

My invention consists, further, in the combination with the cask of a flanged opening, a detachable suction pipe or funnel connected with the flange of the opening, and a check-valve located within the cask for retaining the offensive matter after passing through the valve.

My invention still further consists in the combination, with the air-passage of a night-soil cask, of a float-valve, whereby, when the cask is filled with fluid matters, the valve will be floated and closed, thereby indicating that the cask is filled, and preventing the fluid matter from entering the conducting-pipe and passing through the air-passage to the air-pump, which would otherwise be liable to have its valves clogged thereby and rendered inoperative.

To more particularly describe my invention, I will refer to the accompanying drawings, in which—

Figure 1 represents, in side view, a cask embodying several features of my invention located within a privy. Fig. 2 represents, in side view, an air-pump connected with the cask by a flexible tube or suction-hose, and provided with a deodorizer. Fig. 3 represents a privy-vault. Fig. 4 represents, on an enlarged scale and in detail, in vertical central section, the cask shown in Fig. 1.

A vault is indicated at A. It is provided with the usual entrance or opening, as at *a*. B denotes one of several casks or receptacles which are employed in connection with an air-pump, as at C, for removing the offensive matter from the vault. The cask B has at one end a screw-neck, *i*, and the check-valve *d*, which opens inwardly. Said cask also has another screw-neck, as at M, to which is attached the suction-hose, which communicates with the air-pump. Attached to this neck is also a float-valve, as at *f*, which guards the entrance to the suction tube or hose. The spindle of the valve *f* is provided, in a well-known manner, with guiding devices. The lower portion of the float-valve is provided with cork or other light material, whereby, when the cask is filled with fluid matter, the valve will be floated and effectually close the entrance to the suction air-pipe, preventing the latter, as well as the pump, from being clogged by said matter. The cask is shown to be provided with shoulders *h h*, whereby the hoisting-clamps L may readily be made to engage with the cask. The induction-pipe O is secured to the proper screw-neck on the cask, and it constitutes a tubular connection with the cask, through which the offensive matter is conducted from the vault into the cask.

In operation I proceed as follows: After removing the seat or floor of a privy, uncovering the entrance to the vault, the cask B is suspended by a block and tackle over the vault, connected by the suction-pipe to the air-pump, and then lowered until the funnel-pipe connection O (which is temporarily screwed to the neck *i* of the cask) is at its lower end immersed in the contents to be removed. The air is then exhausted from the cask by means of the pump, and deodorized by the furnace on the pump. The vacuum thus induced causes the matter to be sucked through the funnel-pipe into the cask until the float-valve is lifted and the air-passage closed. The pump is then stopped and the valve *d* closes. The cask, being wholly free from exterior contact with filth, is then lifted, the funnel and suction pipe removed, and the screw-caps V applied to the necks *i* and M, after which the cask is handled like any filled cask, and rolled on its bilge or end.

It will be seen that the cask, when thus constructed, may be lowered to any required depth in a vault, and filled by the vacuum system, regardless of the fact that atmospheric pressure, as heretofore employed in this connection, could only empty a vault to the depth of, say, fifteen or twenty feet.

In operation the pump may be placed closely adjacent to the door of the privy, and the deodorizer serve to a greater or lesser extent to disinfect the surrounding atmosphere.

The operation of transferring the offensive matter to the cask is wholly performed within or near the privy, thus avoiding the objectionable publicity incident to the vacuum system as heretofore employed.

When the vaults have been so far emptied as to leave only the sedimentary deposits, the cask being located closely adjacent thereto, deposits are readily drawn into the cask, which it would be practically impossible to do if such vacuum-system apparatus as has heretofore been employed were relied on.

This portion of the operation is rendered all the more practicable by reason of a large induction-passage to the cask, through which the heavy viscous matters may freely enter.

In night-soil operations, whether with the

United States Patent Office

PTO - BOYERS, PA Duty Station

MISSING PAGE TEMPORARY NOTICE

PATENT # Re 6962 FOR ISSUE DATE 2/29/1876

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE

Left page 3 + rest of doc.

N/A at Boyers
7/14/92

Data Conversion Operation

Boyers, Pa